United States Patent
Wu (10) Patent No.: US 7,233,362 B2
(45) Date of Patent: Jun. 19, 2007

(54) METHOD FOR TRANSFORMING ONE VIDEO OUTPUT FORMAT INTO ANOTHER VIDEO OUTPUT FORMAT WITHOUT DEGRADING DISPLAY QUALITY

(75) Inventor: Chih-Heng Wu, Taipei Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 483 days.

(21) Appl. No.: 10/708,870

(22) Filed: Mar. 30, 2004

(65) Prior Publication Data

US 2005/0046741 A1 Mar. 3, 2005

(30) Foreign Application Priority Data

Aug. 27, 2003 (TW) .............................. 92123665 A (51) Int. Cl.
*H04N 7/01* (2006.01)
(52) U.S. Cl. ..................................... 348/448
(58) Field of Classification Search ................ 348/433, 348/458, 441, 448, 555
See application file for complete search history.

(56) References Cited

U.S. PATENT DOCUMENTS

| | | | | |
|---|---|---|---|---|
| 4,807,031 A | * | 2/1989 | Broughton et al. | ......... 348/460 |
| 5,161,014 A | * | 11/1992 | Pearson et al. | ............. 348/443 |
| 5,274,447 A | * | 12/1993 | Nakagaki et al. | ........... 348/443 |
| 5,329,309 A | * | 7/1994 | Dorricott et al. | ............. 348/97 |
| 5,488,389 A | * | 1/1996 | Nakanishi et al. | .......... 345/670 |
| 5,610,661 A | * | 3/1997 | Bhatt | ........................ 348/446 |
| 6,144,410 A | * | 11/2000 | Kikuchi et al. | ............. 348/441 |
| 6,330,032 B1 | * | 12/2001 | Boehlke | ...................... 348/452 |
| 6,501,507 B1 | * | 12/2002 | Canfield | ...................... 348/441 |
| 6,504,577 B1 | * | 1/2003 | Voltz et al. | ................. 348/448 |
| 6,873,368 B1 | * | 3/2005 | Yu et al. | ..................... 348/441 |
| 6,927,801 B2 | * | 8/2005 | Yugami et al. | ............. 348/458 |

* cited by examiner

*Primary Examiner*—Paulos M. Natnael
(74) *Attorney, Agent, or Firm*—Winston Hsu (57) ABSTRACT

A method of transforming output formats of video data without degrading display quality. Video data include a plurality of first display data corresponding to a plurality of first odd fields and a plurality of second display data corresponding to a plurality of first even fields. The first display data and the second display data are interlaced to form a plurality of first frames corresponding to a first resolution. The method includes deinterlacing the first and second display data to generate a plurality of third display data, adjusting the third display data for making the third display data correspond to a second resolution, and extracting a plurality of fourth display data corresponding to a plurality of second odd fields and a plurality of fifth display data corresponding to a plurality of second even fields from the third display data.

8 Claims, 11 Drawing Sheets

METHOD FOR TRANSFORMING ONE VIDEO OUTPUT FORMAT INTO ANOTHER VIDEO OUTPUT FORMAT WITHOUT DEGRADING DISPLAY QUALITY

BACKGROUND OF INVENTION

1. Field of the Invention

The invention relates to a method for transforming formats of video data, and more particularly, to a method for transforming formats of video data without degrading the display quality.

2. Description of the Prior Art

Figure 1:
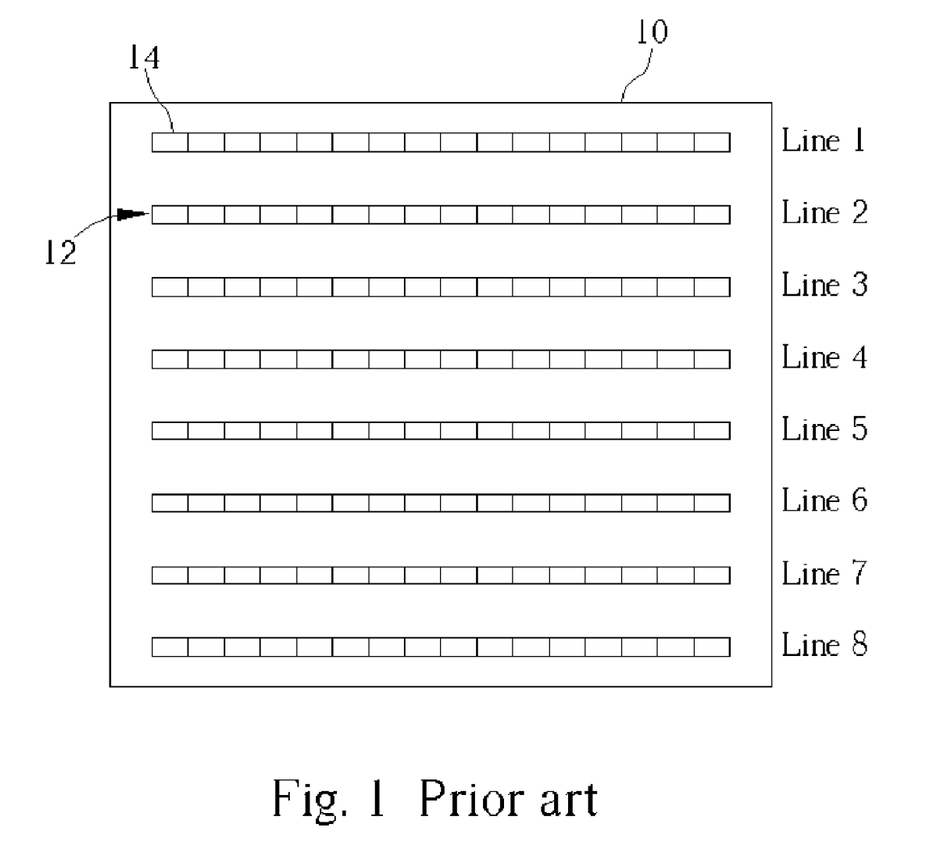
FIG. 1 is a schematic diagram of a display screen according to the prior art.
Figure 2:
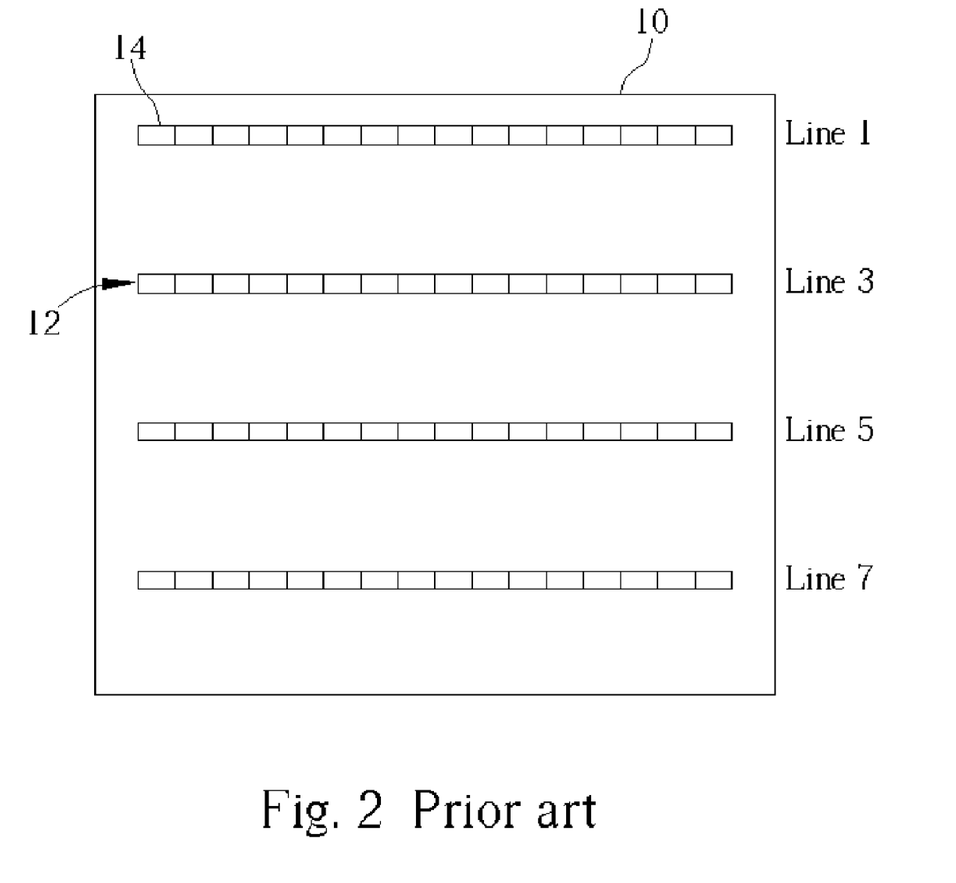
FIG. 2 is a schematic diagram showing that the display screen shown in FIG. 1 outputs an odd field.
Figure 3:
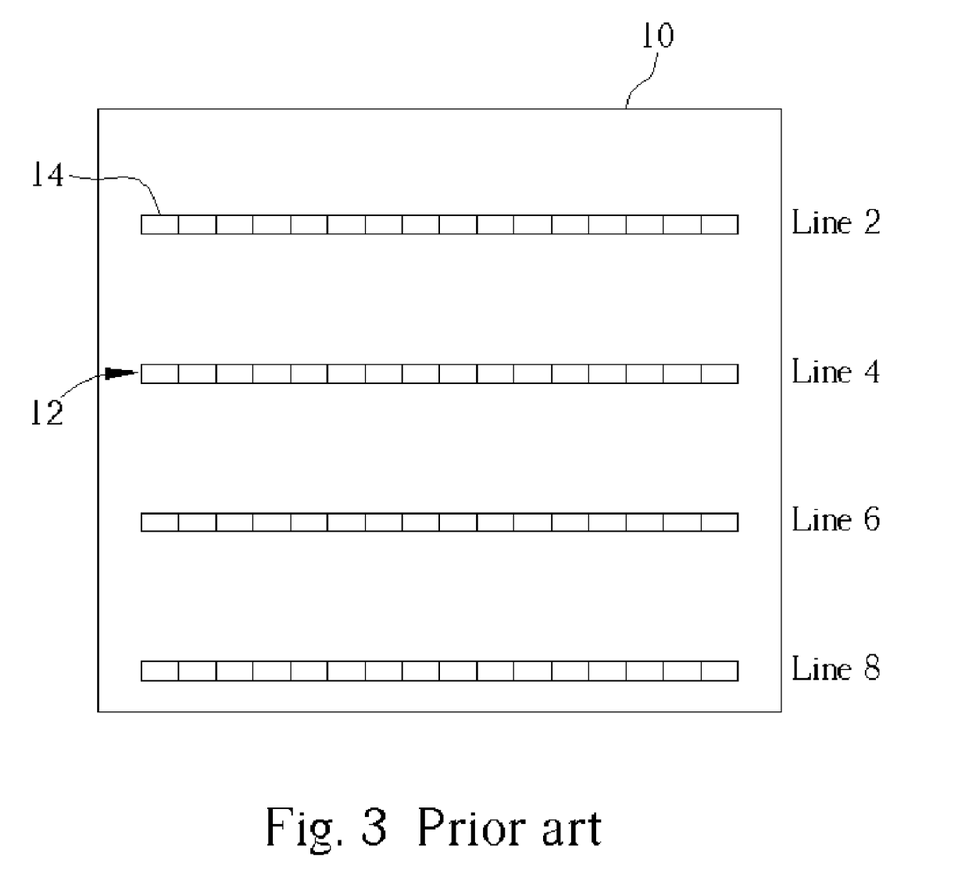
FIG. 3 is a schematic diagram showing that the display screen shown in FIG. 1 outputs an even field.

Generally, the present TV video output specifications can be classified into an NTSC (National Television Standards Committee)format and a PAL (Phase Alternation Line) format. Regarding the television display conforming to the NTSC specification, the television display corresponds to 525 scan lines, wherein 480 scan lines are effective scan lines for displaying images. Regarding the television display conforming to the PAL format, the television display corresponds to 625 scan lines, wherein 576 scan lines are effective scan lines for displaying images. In other words, the NTSC specification and PAL specification respectively correspond to different resolutions. Basically, concerning both the NTSC specification and the PAL specification, the image frames are interlaced to be output. Please refer to FIG. 1 to FIG. 3. FIG. 1 is a schematic diagram of a display screen 10 according to the prior art, and FIG. 2 is a schematic diagram showing that the display screen 10 shown in FIG. 1 outputs an odd field. FIG. 3 is a schematic diagram showing that the display screen 10 shown in FIG. 1 outputs an even field. The display screen 10 consists of a plurality of scan lines 12, and each scan line 12 comprises a plurality of pixels 14. In order to illustrate the interlaced display operation, only eight scan lines Line1-Line8 are displayed in FIG. 1. According to the NTSC specification and the PAL specification, the odd field and the even field form a complete frame. Regarding the odd field shown in FIG. 2, the display screen 10 can be used to output images by alternate-line scanning; that is, when gray scales of all the pixels 14 are determined from the left side to the right side of the scan line Line1, the scan line Line2 neighboring the scan line Line1 does not operate the settings related to the gray scales of the pixels 14, but immediately determines the gray scale of each pixel 14 of the scan line Line3 from the left side to the right side instead. Similarly, afterwards the scan line Line5 operates the settings related to the gray scale of each pixel 14, and then the scan line Line7 operates the settings related to the gray scale of each pixel 14. Therefore, among all the scan lines 12 on the display screen 10, only the odd-numbered scan lines 12 will be driven to display the odd field. On the other hand, regarding the even field shown in FIG. 3, the display screen 10 can be used to output images by the similar alternate-line scanning. The first scan line Line1 will not be driven while the scan line Line2 neighboring the scan line Line1 will be driven. After the scan line Line2 finishes the settings of the gray scale of each pixel 14 from the left side to the right side, the scan line Line3 neighboring the scan line Line2 does not operate the settings related to the gray scale of each pixel 14 while the scan line Line4 starts to determine the gray scale of each pixel 14 from the left side to the right side. Therefore, among all the scan lines 12 on the display screen 10, only the even-numbered scan lines 12 will be driven to display the even field.

Obviously, after the display screen 10 outputs an odd field and an even field in sequence, each pixel 14 of the display screen 10 has been determined with a corresponding gray scale setting. Concerning the display screen 10, which displays a frame, according to the NTSC specification, the display screen 10 takes 1/60 second to output an odd field or an even field; that is, a frame rate is 30. According to the PAL specification, the display screen 10 takes 1/50 second to output an odd field or an even field, that is, the frame rate is 25. In other words, the image outputs of the NTSC specification and the PAL specification respectively correspond to different frame rates. In summary, regarding the NTSC specification, the resolution of the output image (720*480) is lower with a higher frame rate, while, regarding the PAL specification, the resolution of the output image (720*576) is higher with a lower frame rate.

Figure 4:
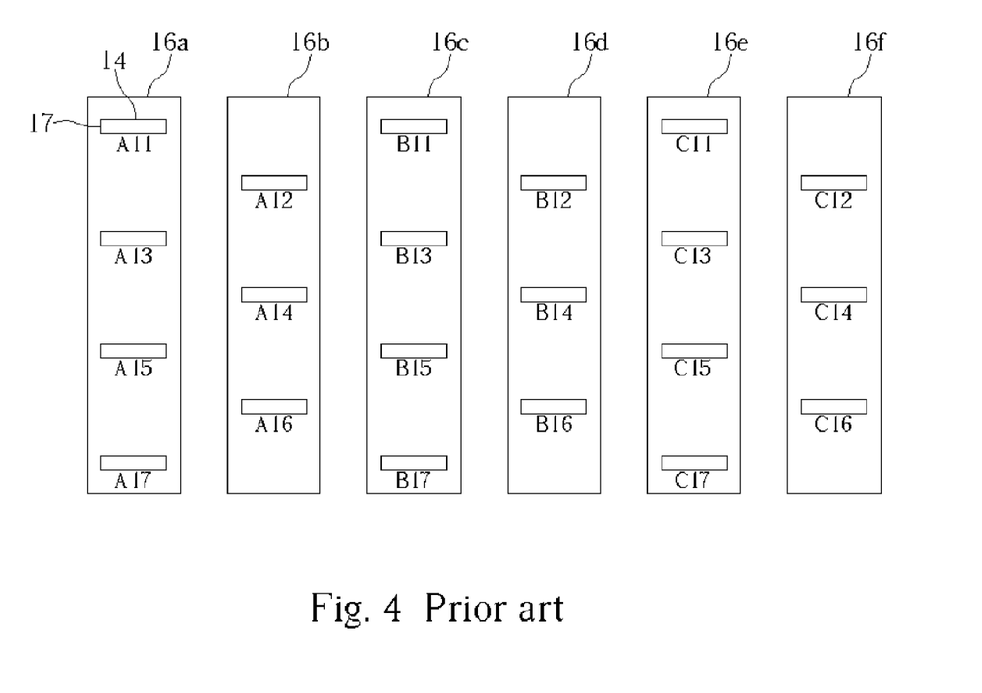
FIG. 4 is a schematic diagram of data conforming to the NTSC format according to the prior art.
Figure 5:
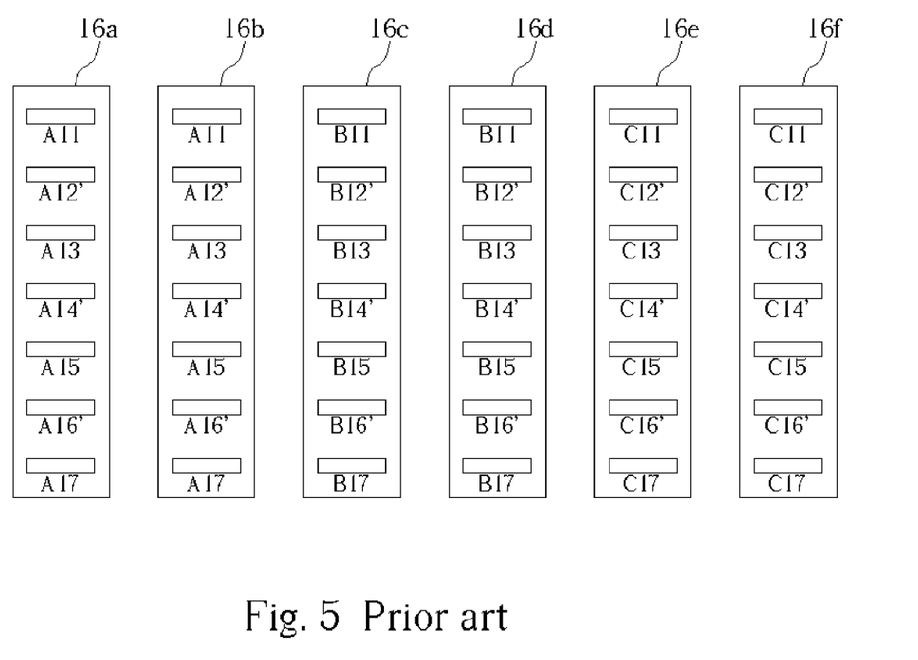
FIG. 5, FIG. 6, and FIG. 7 are schematic diagrams showing the format transformation from the NTSC format to the PAL format according to the prior art.
Figure 6:
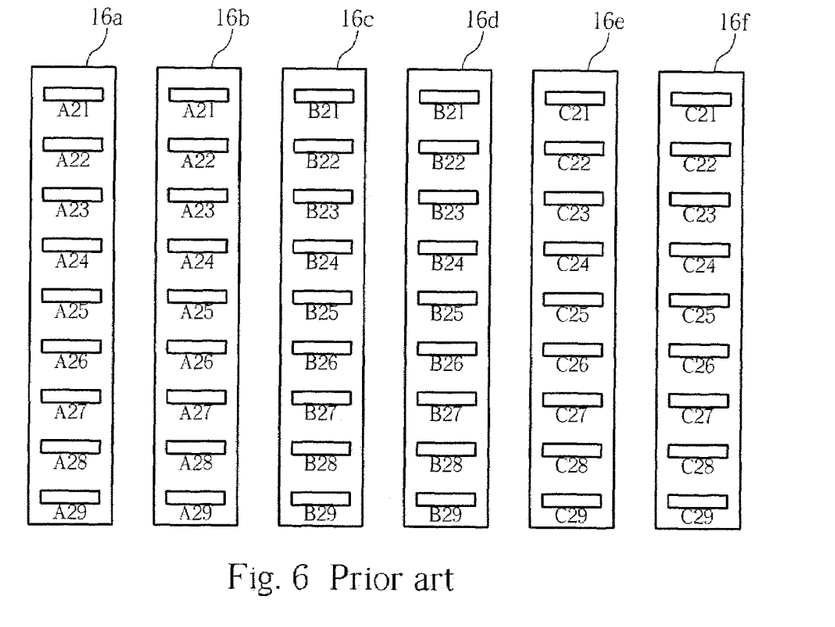
Figure 7:
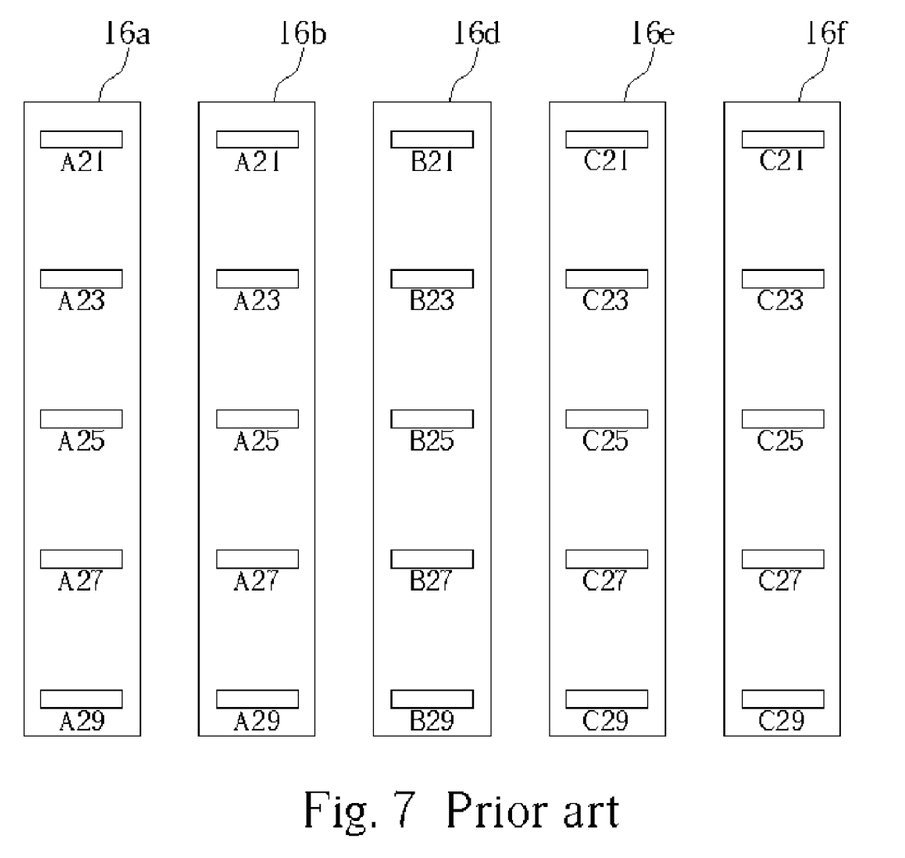

Since the DVD (digital versatile disc) has the advantage of large capacity for storage, the DVD can be used to store digital data, including video data and audio data. The NTSC specification and the PAL specification respectively correspond to different resolutions and frame rates; when a movie is compressed according to the NTSC format to be recorded on the DVD, a user has to operate a video-output-format transformation process to transform the video data conforming to the NTSC format into that conforming to the PAL format and then utilize a television conforming to the PAL format when the user wants to make use of the television conforming to the PAL format to play the video data conforming to the NTSC format. Please refer to FIG. 4 to FIG. 7. FIG. 4 is a schematic diagram of data conforming to the NTSC format according to the prior art while FIG. 5, FIG. 6, and FIG. 7 are schematic diagrams showing the format transformation from the NTSC format to the PAL format according to the prior art. As shown in FIG. 4, a plurality of the display data 16a, 16b, 16c, 16d, 16e, 16f are shown. Each the display data 16a, 16b, 16c, 16d, 16e, 16f includes a plurality of scan line data 17, while a plurality of the display data 16a, 16b, 16c, 16d, 16e, 16f correspond the NTSC format, wherein the display data 16a, 16c, 16e are used to display the odd field, while the display data 16b, 16d, 16f are used to display the even field. In other words, the display data 16a, 16b are combined to be used to generate a complete frame, the display data 16c, 16d are combined to be used to generate a complete frame, and the display data 16e, 16f are combined to be used to generate a complete frame. Afterwards, according to the prior-art deinterlace technique, the display data 16a, 16b, 16c, 16d, 16e, 16f shown in FIG. 5 can be generated. The display data 16a includes, besides the original scan line data A11, A13, A15, A17, a plurality of scan line data A12', A14', A16', wherein the scan line data A12' is generated by an inner-insertion operation based on the scan line data A11 and the scan line data A13, the scan line data A14' is generated by the inner-insertion operation based on the scan line data A13 and the scan line data A15, and the scan line data A16' is generated by the inner-insertion operation based on the scan line data A15 and the scan line data A17. The above-mentioned inner-insertion operation is an arithmetic mean operation. For instance, regarding the display screen 10 shown in FIG. 1, an arithmetic mean of the gray scale corresponding to the first pixel 14 of the scan line Line1 and the gray scale corresponding to the first pixel 14 of the scan line Line3 can be set as the gray scale corresponding to the first pixel 14 of the scan line Line2. Therefore, the display data of the two scan lines 12 can be used to generate new display data of the scan line located between the two scan lines 12. Regarding the display data 16a shown in FIG. 5, after the inner-insertion operation, the scan line data A12' is used to substitute for the scan line data A12 of the display data 16b shown in FIG. 4, the scan line data A14' is used to substitute for the scan line data A14 of the display data 16b, and the scan line data A16 is used to substitute for the scan line data A16 of the display data 16b. In other words, the display data 16a can be used to progressively drive a complete frame.

Regarding the display data 16b shown in FIG. 4, the display data 16b are deinterlaced according to the scan line data A11, A13, A15, and A17 of the display data 16a. As shown in FIG. 5, the refreshed display data 16b can be the same as the display data 16a; that is, the display data 16b include the scan line data A11, A12', A13, A14', A15, A16', A17 after being deinterlaced. From the above-mentioned paragraph, the display data 16c, 16d include the scan line data B11, B12', B13, B14', B15, B16', B17 after being deinterlaced, and the display data 16e, 16f include the scan line data C11, C12', C13, C14', C15, C16', C17 after being deinterlaced. The NTSC specification and the PAL specification respectively correspond to different resolutions; that is, the NTSC specification and the PAL specification respectively utilize the scan lines of different amounts to output images, wherein the PAL specification requires more scan lines. Therefore, the display data 16a, 16b, 16c, 16d, 16e, 16f shown in FIG. 5 should make use of a predetermined algorithm to the scan line data thereof. According to the prior art, a bi-linear interpolation can be used to process the display data 16a, 16b, 16c, 16d, 16e, 16f, shown in FIG. 5, and the result is shown in FIG. 6. Taking the display data 16a as an example, the display data 16a initially include 7 scan line data A11, A12', A13, A14', A15, A16', A17; after being processed by the prior-art bi-linear interpolation, the display data 16a include 9 scan line data A21, A22, A23, A24, A25, A26, A27; that is, the processed display data 16a can be used to drive 9 scan lines to display a frame while the original display data 16a can used to drive only 7 scan lines to display a frame.

Furthermore, the NTSC specification and the PAL specification correspond to different frame rates, wherein the NTSC specification requires displaying 30 frames (30 odd fields and 30 even fields) per-second and the PAL specification requires displaying 25 frames per-second (25 odd fields and 25 even fields). Therefore, when the data conforming to the NTSC specification are transformed to be the data conforming to the PAL specification, one display data should be neglected for every six display data to reduce the frame rate. For instance, the display data 16c will be neglected in FIG. 6, and finally only five display data 16a, 16b, 16d, 16e, 16f can be used to generate image frames. In addition, the display data 16a, 16b, 16d, 16e, 16f shown in FIG. 6 include data for a complete frame. When the data conforming to the PAL specification are interlaced to be output, according to the prior art, generally images are displayed in a single-field way. As shown in FIG. 7, the display data 16a, 16b, 16d, 16e, 16f correspond to the odd field; similarly, the display data 16a, 16b, 16d, 16e, 16f correspond to the even field to proceed with frame display.

Since the NTSC specification and the PAL specification respectively correspond to different frame rates, during the format transformation, one display data (corresponding to 1 field) should be neglected among the six original display data (corresponding to 6 fields) to reduce the frame rate. In addition, in order to solve the nonsmoothness of frame display caused by the reduction of the frame rate, according to the prior art, the single-field way is applied to display the display data conforming to the PAL format. However, the single-field way will lead to a reduction of the resolution. When an odd field and an even field are used to form a frame, the resolution of the frame reduces along with the reduction of the available scan lines if only an odd field or an even field is utilized. Therefore, in order to improve the saw-tooth effect of the frame caused by the reduction of the resolution, the prior-art technique makes use of an arithmetic mean operation to proceed with the deinterlace process as shown in FIG. 5. Afterwards, the bi-linear interpolation is performed to process the display data 16a, 16b, 16c, 16d, 16e, and 16f shown in FIG. 5. Since the above-mentioned deinterlace process can only aim at the scan line data of the odd field to calculate the scan line data of the even field according to the arithmetic mean operation rather than taking the scan line data of the practical even field into consideration, the saw-tooth effect still exists to aggravate the display quality during the transformation of the display data from conforming to the NTSC specification into conforming to the PAL specification.

SUMMARY OF INVENTION

It is therefore a primary objective of the claimed invention to provide a method a method for transforming formats of video data to solve the above-mentioned problems.

According to the claimed invention, a method for transforming output formats of video data is disclosed. The video data comprises a plurality of first display data and a plurality of second display data, and the plurality of first display data correspond to a plurality of first odd fields, the plurality of second display data correspond to a plurality of first even fields, and the plurality of first odd fields and the plurality of first even fields are interlaced to form a plurality of first frames. The plurality of first frames correspond to a first resolution. The method comprises: (a) deinterlacing the plurality of first display data and the plurality of second display data to generate a plurality of third display data; (b) arranging the plurality of third display data to make the plurality of third display data correspond to a second resolution; and (c) extracting a plurality of fourth display data corresponding to a plurality of second odd fields from the plurality of third display data, and extracting a plurality of fifth display data corresponding to a plurality of second even fields from the plurality of third display data.

In the claimed invention, since the video-format transformation method of the present invention utilizes a motion adaptive deinterlace algorithm to deinterlace the display data originally conforming to the NTSC format, the distortion of the prior-art arithmetic mean operation for deinterlacing the practical image frames can be avoided. Furthermore, when the scan line data are reduced to extract the desired field, the video-format transformation method of the present invention can generate an odd field and an even field in sequence. Therefore, each frame still comprises an odd field and an even field; that is, the video-format transformation method of the present invention need not to sacrifice the resolution to acquire stable frames and the display quality can be kept.

These and other objectives of the present invention will no doubt become obvious to those of ordinary skill in the art after reading the following detailed description of the preferred embodiment, which is illustrated in the various figures and drawings.

BRIEF DESCRIPTION OF DRAWINGS

FIG. 8 is a flow chart showing the video-format transformation according to the present invention.

DETAILED DESCRIPTION

The method and structure can refer to FIG. 8, which is a flow chart showing the video-format transformation according to the present invention. The video-format transformation operation of the present invention includes following steps. First of all, transform the display data conforming to the NTSC format (480i) into the display data conforming to the NTSC format (480p); that is, the prior-art motion adaptive deinterlace algorithm can be used to deinterlace the display data related to an odd field and a corresponding even field. The display data will be further be transformed into the display data corresponding to a frame (step 100). Afterwards, the prior-art bi-linear interpolation can be used to transform the display data (480p) into the display data (576p) conforming to the PAL specification; that is, in a vertical direction, the original scan line data of the display data (480p) can be increased to meet the requirement of vertical resolution of the PAL specification (step 102). The NTSC specification and the PAL specification utilize different frame rates to output images, wherein the frame rate conforming to the NTSC specification is 30, while the frame rate conforming to the PAL specification is 25. In other words, ding the transformation of the display data from conforming to the NTSC format into conforming to the PAL format, one display data should be neglected among every six display data to reduce the frame rate (from originally 30 frames per-second to 25 frames per-second) (step 104). In the meantime, each display data (576p) corresponds to a complete frame. In order to interlace the output image frames conforming to the PAL format, the present embodiment further reduces the scan line data of each the display data to generate in sequence the display data corresponding to the odd field (576i) and the display data corresponding to the even field (576i)(step 106).

Figure 9:
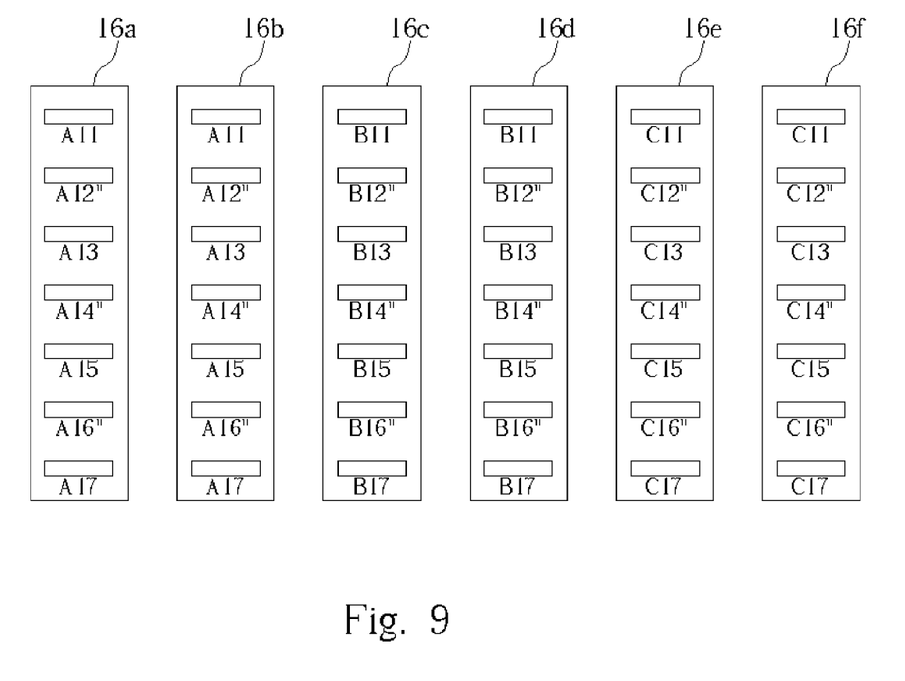
FIG. 9, FIG. 10, and FIG. 11 are schematic diagrams showing the transformation of the data from conforming to the NTSC format into conforming to the PAL format according to the present invention.
Figure 10:
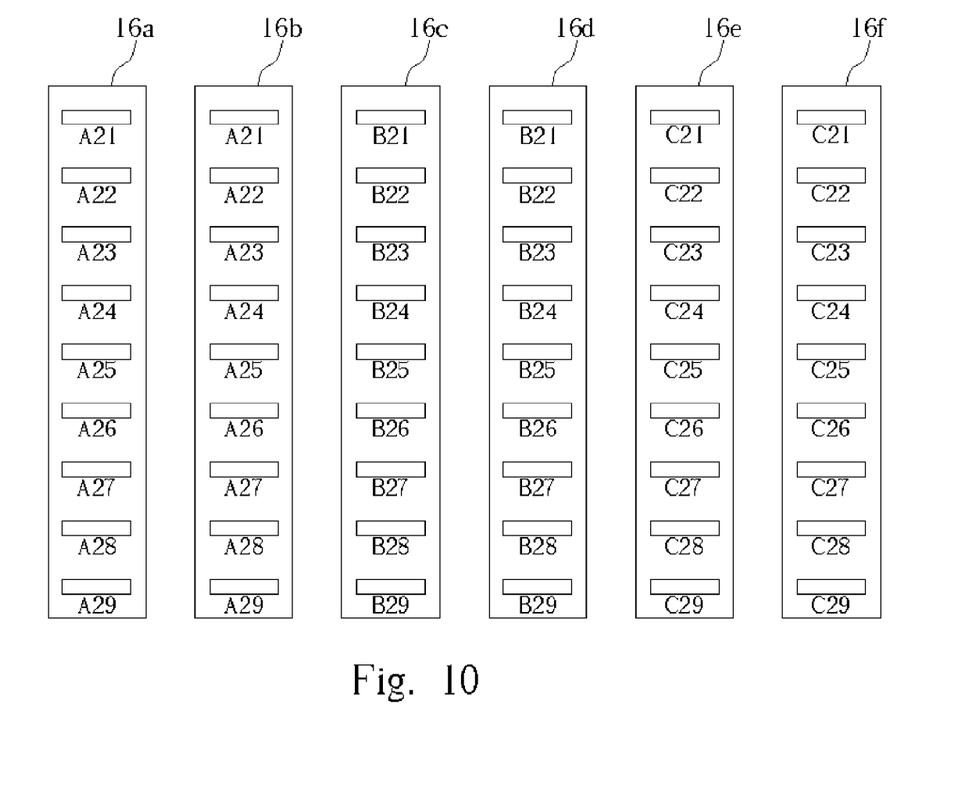
Figure 11:
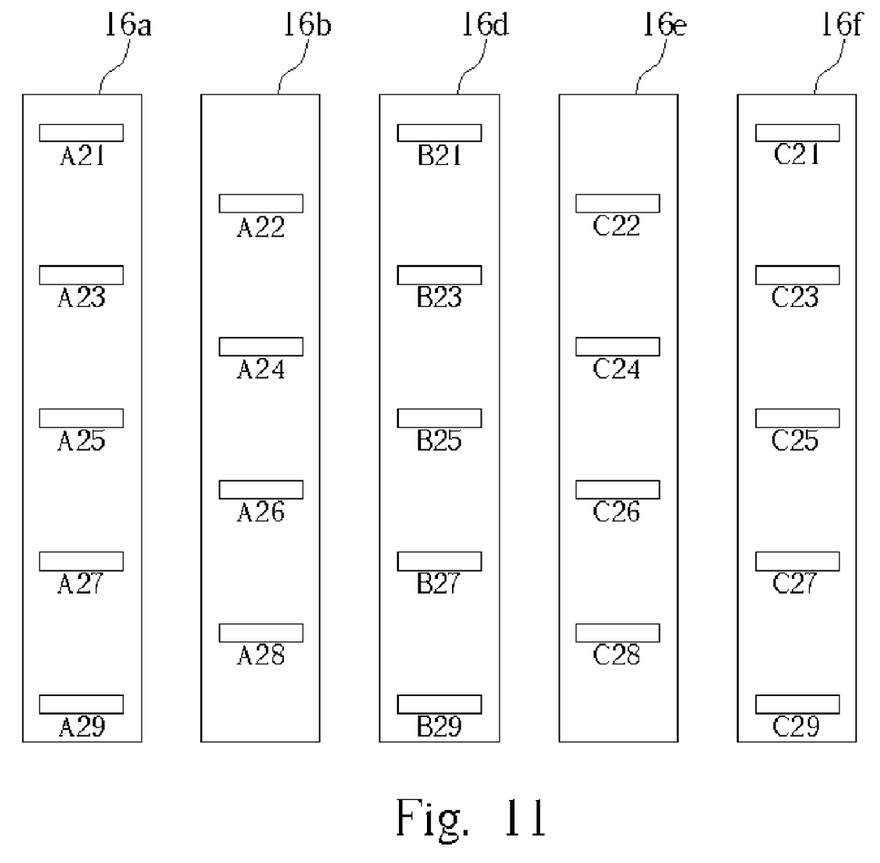

Please refer to FIG. 4 and FIG. 9 to FIG. 11. FIG. 9 to FIG. 11 are schematic diagrams showing the transformation of the data from conforming to the NTSC format into conforming to the PAL format according to the present invention. As shown in FIG. 4, a plurality of the display data 16a, 16b, 16c, 16d, 16e, 16f are shown, and each display data 16a, 16b, 16c, 16d, 16e, 16f includes a plurality of the scan line data 17. In addition, the plurality of display data 16a, 16b, 16c, 16d, 16e, 16f conform to the NTSC format, wherein the display data 16a, 16c, 16e are used to display the odd field, while the display data 16b, 16d, 16f are used to display the even field. In other words, the display data 16a, 16b are combined to be used to generate a complete frame, the display data 16c, 16d are combined to be used to generate a complete frame, and the display data 16e, 16f are combined to be used to generate a complete frame. Afterwards, according to the prior art motion adaptive deinterlace algorithm, the display data 16a, 16b, 16c, 16d, 16e, 16f,
shown in FIG. 9 are generated. Regarding the display data 16a, the display data 16a includes the original scan line data A11, A13, A15, A17 and a plurality of additional scan line data A12", A14", A16". The motion adaptive deinterlace algorithm can be used to determine the scan line data A12" according to whether any relative motion exists between the image corresponding to the scan line data A12 and the image corresponding to the scan line data A11, A13. For instance, the scan line data A11, A13 are used to display a partial background object, while the scan line that the scan line data A12 corresponds to is located between the scan lines that the scan line data A11, A13 correspond to. If there is no motion for the background object at the timing that the display data 16a, 16b respectively correspond to, the scan line data A12 can be set as the scan line data A12" because the prior-art motion adaptive deinterlace algorithm determines the background object not to move. On the other hand, if the background object moves at the timing that the display data 16a, 16b respectively correspond to, the prior-art motion adaptive deinterlace algorithm can be used to detect the movement of the background object, and the scan line data A11, A13 are used to generate the desired scan line data A12". For instance, an arithmetic mean operation can be used to process the scan line data A11, A13 to generate the scan line data A12". Regarding the display screen 10 shown in FIG. 1, when the above-mentioned background object corresponding to the first pixel 14 of the scan line Line1 and the first pixel 14 of the scan line Line3 does not move, the gray scale of the first pixel 14 of the scan line Line1 and the gray scale of the first pixel 14 of the scan line Line3 can be set as the gray scale of the first pixel 14 of the scan line Line2 according to the arithmetic mean operation; that is, the display data of the two scan lines 12 can be used to acquire the display data of the scan line located between the two scan lines 12. Obviously, the scan line data A12", A14", A16" correspond to the even-numbered scan lines, and the scan line data A11, A13, A15, A17 correspond to the odd-numbered scan lines. In other words, the display data 16a can be used to progressively scan/drive a complete frame. In the present embodiment, the display data 16b can be inserted into the scan line data A12", A14", A16" according to the scan line data A11, A13, A15, A17. As shown in FIG. 9, after the deinterlace process, the display data 16b should be equal to the display data 16a and both include the scan line data A11, A12", A13, A14", A15, A16", A17. The display data 16c, 16d, after the deinterlace process, also include the identical scan line data B11, B12", B13, B14", B15, B16", B17; the display data 16e, 16f, after the deinterlace process, also include the identical scan line data C11, C12", C13, C14", C15, C16", C17.

As previously mentioned, the NTSC specification and the PAL specification respectively correspond to different resolutions; that is, different amounts of scan lines are used to output images in the NTSC specification and the PAL specification respectively, wherein the PAL specification requires more scan lines. Therefore, regarding the display data 16a, 16b, 16c, 16d, 16e, 16f shown in FIG. 9, the scan line data have to be increased by a predetermined algorithm. For instance, the prior-art bi-linear interpolation can be utilized to process the display data 16a, 16b, 16c, 16d, 16e, 16f shown in FIG. 9 leading to the result shown in FIG. 10. Regarding the display data 16a, the display data 16a originally include 7 scan line data A11, A12", A13, A14", A15, A16", A17. After being processed by the prior-art bi-linear interpolation, the display data 16a include 9 scan line data A21, A22, A23, A24, A25, A26, A27, A28, A29; that is, the original display data 16a can only be used to drive 7 scan lines to display a frame, while the processed display data 16a can be used to drive 9 scan lines to display a frame.

In addition, according to the NTSC specification and the PAL specification, the two specifications correspond to different frame rates, wherein the NTSC specification requires 30 frames displayed per-second (30 odd fields and 30 even fields displayed per-second) and the PAL specification requires 25 frames displayed per-second (25 odd fields and 25 even fields displayed per-second). Therefore, when the data conforming to the NTSC specification are transformed to be the data conforming to the PAL specification, one display data (corresponding to one field) for every six display data (corresponding to six fields) should be neglected to reduce the frame rate. For instance, when image frames are displayed according to the PAL specification, neglect the display data 16c shown in FIG. 10 so that only five display data 16a, 16b, 16d, 16e, 16f can be used to generate image frames. Furthermore, the display data 16a, 16b, 16d, 16e, 16f shown in FIG. 10 correspond to a complete frame. When the data are outputted in interlace display according to the PAL specification, the present embodiment utilizes the prior-art technique (decimation) to reduce the scan line data to get the display data of the desired field. As shown in FIG. 11, the display data 16a include the scan line data A21, A23, A25, A27, A29 corresponding to the odd field, while the display data 16b include the scan line data A22, A24, A26, A28 corresponding to the even field. When image frames are displayed according to the PAL specification on a television, the display data 16c shown in FIG. 10 will be neglected. Regarding the display data 16d, the display data 16d finally include the scan line data B21, B23, B25, B27, B29, corresponding to the odd field while the display data 16e include the scan line data C22, C24, C26, C28, corresponding to the even field and the display data 16f include the scan line data C21, C23, C25, C27, C29 corresponding to the odd field. Therefore, in the present embodiment, after the display data 16a, 16b, 16c, 16d, 16e, 16f conforming to the NTSC format are transformed into the display data 16a, 16b, 16d, 16e, 16f conforming to the PAL format, the display data 16a, 16b, 16d, 16e, 16f still can be interlaced to display the odd field and the even field.

According to the NTSC specification and the PAL specification, since the two specifications correspond to different frame rates, one display data (corresponding to one field) for every six display data (corresponding to six fields) should be neglected to reduce the frame rate when the data conforming to the NTSC specification are transformed to be the data conforming to the PAL specification. In addition, the present embodiment interlaces the odd field and the even field to display image; that is, when the PAL format is utilized to output image frames, an odd field and an even field consist of a complete frame with no resolution changed so that the saw-tooth effect can be eliminated. Moreover, the present embodiment utilizes the motion adaptive deinterlace algorithm to proceed with the deinterlace process to use the scan line data of the original odd field and the corresponding even field to generate the scan line data corresponding to a complete frame. Since the motivation of objects in frames is taken into consideration, during the deinterlace process, the scan line data corresponding to a complete frame can be more accurate. Afterwards, the distortion can be reduced during the following bi-linear interpolation for increasing the scan line data, and the saw-tooth effect can be eliminated when the odd field and the even field are extracted.

In contrast to the prior-art technique, the present invention video-format transformation method utilizes a motion adaptive deinterlace algorithm to deinterlace the display data originally conforming to the NTSC format, and the distortion of the prior-art arithmetic mean operation for deinterlacing the practical image frames can be avoided. Furthermore, when the scan line data are reduced to extract the desired field, the video-format transformation method of the present invention can generate an odd field and an even field in sequence. Therefore, each frame still comprises an odd field and an even field. The video-format transformation method of the present invention does not require sacrificing the resolution to acquire stable frames and the display quality can be kept.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method for transforming output formats of video data, the video data comprising a plurality of first display data and a plurality of second display data, the plurality of first display data corresponding to a plurality of first odd fields, the plurality of second display data corresponding to a plurality of first even fields, the plurality of first odd fields and the plurality of first even fields being interlaced to form a plurality of first frames, the plurality of first frames corresponding to a first resolution, the method comprising:
   (a) deinterlacing the plurality of first display data and the plurality of second display data to generate a plurality of third display data;
   (b) arranging the plurality of third display data to make the plurality of third display data correspond to a second resolution; and
   (c) extracting a plurality of fourth display data corresponding to a plurality of second odd fields from the plurality of third display data, and extracting a plurality of fifth display data corresponding to a plurality of second even fields from the plurality of third display data,
   wherein the plurality of first display data and the second display data can be used to drive the plurality of first frames according to a first frame rate, and in step (c), the plurality of fourth display data and the plurality of fifth display data are generated according to a second frame rate.

2. The method of claim 1 further comprising: interlacing the plurality of fourth display data and the plurality of fifth display data to form a plurality of second frames corresponding to the second resolution.

3. The method of claim 1 wherein in step (c), only partial data is extracted from the plurality of third display data to generate the plurality of fourth display data and the plurality of fifth display data.

4. The method of claim 1 wherein the first frame rate and the first resolution conform to an NTSC (National Television System Committee) specification, while the second frame rate and the second resolution conform to a PAL (Phase Alternation Line) specification.

5. The method of claim 1 wherein in step (b), a bi-linear interpolation is applied to arrange the plurality of third display data.

6. The method of claim 1 wherein in step (a), a motion adaptive deinterlace algorithm is applied to generate the plurality of third display data.

7. A method for transforming output formats of video data, the video data comprising a plurality of first display data and a plurality of second display data, the plurality of first display data corresponding to a plurality of first odd fields, the plurality of second display data corresponding to a plurality of first even fields, the plurality of first odd fields and the plurality of first even fields being interlaced to form a plurality of first frames, the plurality of first frames corresponding to a first resolution, the method comprising:

(a) deinterlacing the plurality of first display data and the plurality of second display data to generate a plurality of third display data;

(b) arranging the plurality of third display data to make the plurality of third display data correspond to a second resolution;

(c) extracting a plurality of fourth display data corresponding to a plurality of second odd fields from the plurality of third display data, and extracting a plurality of fifth display data corresponding to a plurality of second even fields from the plurality of third display data, and interlacing the plurality of fourth display data and the plurality of fifth display data to form a plurality of second frames corresponding to the second resolution;

wherein in step (a), a motion adaptive deinterlace algorithm is applied to generate the plurality of third display data.

8. A method for transforming output formats of video data, the video data comprising a plurality of first display data and a plurality of second display data, the plurality of first display data corresponding to a plurality of first odd fields, the plurality of second display data corresponding to a plurality of first even fields, the plurality of first odd fields and the plurality of first even fields being interlaced to form a plurality of first frames, the plurality of first frames corresponding to a first resolution, the method comprising:

(a) deinterlacing the plurality of first display data and the plurality of second display data to generate a plurality of third display data;

(b) arranging the plurality of third display data to make the plurality of third display data correspond to a second resolution; and (c) extracting a plurality of fourth display data corresponding to a plurality of second odd fields from the plurality of third display data, and extracting a plurality of fifth display data corresponding to a plurality of second even fields from the plurality of third display data, wherein in step (a), a motion adaptive deinterlace algorithm is applied to generate the plurality of third display data, and in step (c), only partial data is extracted from the plurality of third display data to generate the plurality of fourth display data and the plurality of fifth display data.

* * * * *